United States Patent [11] 3,608,646

| [72] | Inventor | Edward Clyde Ryan |
| | | Ankeny, Iowa |
| [21] | Appl. No. | 778,982 |
| [22] | Filed | Nov. 26, 1968 |
| [45] | Patented | Sept. 28, 1971 |
| [73] | Assignee | Deere & Company |
| | | Moline, Ill. |

[54] ROTARY HOE
39 Claims, 9 Drawing Figs.

[52] U.S. Cl.................................................. 172/500,
172/551, 172/572, 172/627, 172/643
[51] Int. Cl................................................. A01b 33/14
[50] Field of Search........................................ 172/551,
572, 573, 710, 711, 462, 500, 506, 627, 643

[56] References Cited
UNITED STATES PATENTS

| 245,423 | 1881 | Weller | 172/462 |
| 1,053,095 | 2/1913 | Iverson | 172/462 |
| 1,331,722 | 2/1920 | Remy | 172/572 X |
| 1,386,132 | 8/1921 | Rodemeyer | 172/572 X |
| 1,639,307 | 8/1927 | Neu | 172/572 X |
| 2,839,980 | 6/1958 | Evans et al | 172/627 X |
| 117,746 | 8/1871 | Cornells | 172/551 X |
| 901,533 | 10/1908 | Ham | 172/573 X |
| 928,029 | 7/1909 | Craig | 172/572 |
| 1,115,839 | 11/1914 | Kramer | 172/572 X |
| 1,225,400 | 5/1917 | Black | 172/572 |
| 3,213,946 | 10/1965 | Carrick | 172/551 X |

FOREIGN PATENTS

| 480,493 | 1927 | Germany | 172/572 |
| 253,819 | 11/1912 | Germany | 172/573 |

Primary Examiner—Clyde I. Coughenour
Attorneys—H. Vincent Harsha, Harold M. Knoth, William A. Murray and John M. Nolan ABSTRACT: A plurality of transverse sets of front and rear gangs of hoe wheels are individually mounted on a tool bar by leaf springs which will transfer the weight of the tool bar to the gangs to provide down pressure and allow a high degree of flexibility between the sets of front and rear gangs and between the gangs of a single set so that the gangs can follow the ground contour and have excellent soil penetration.

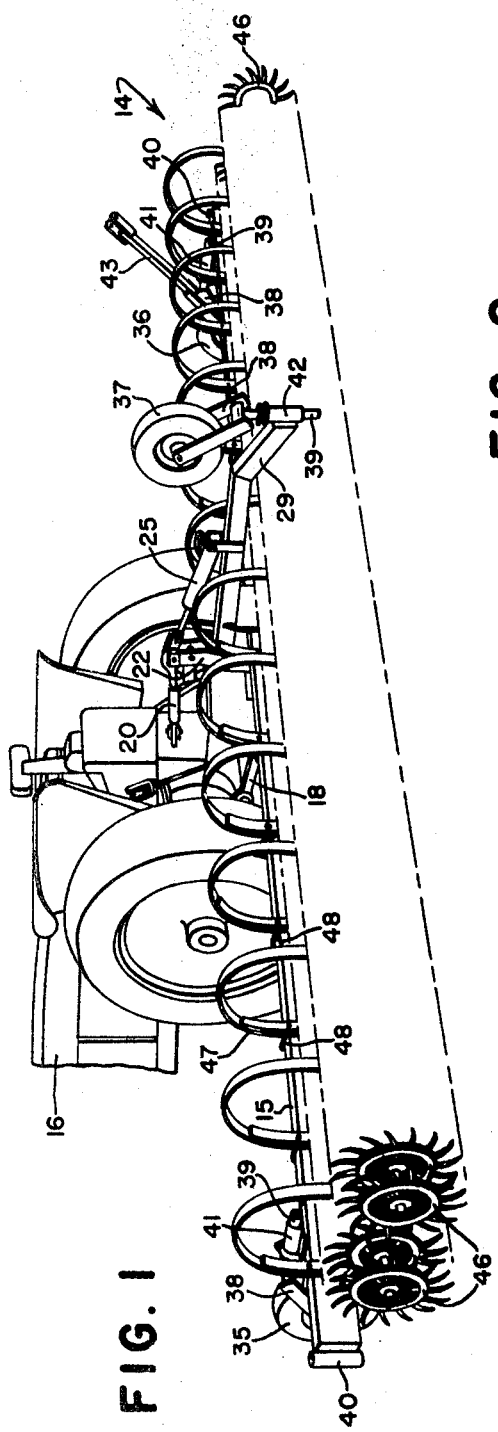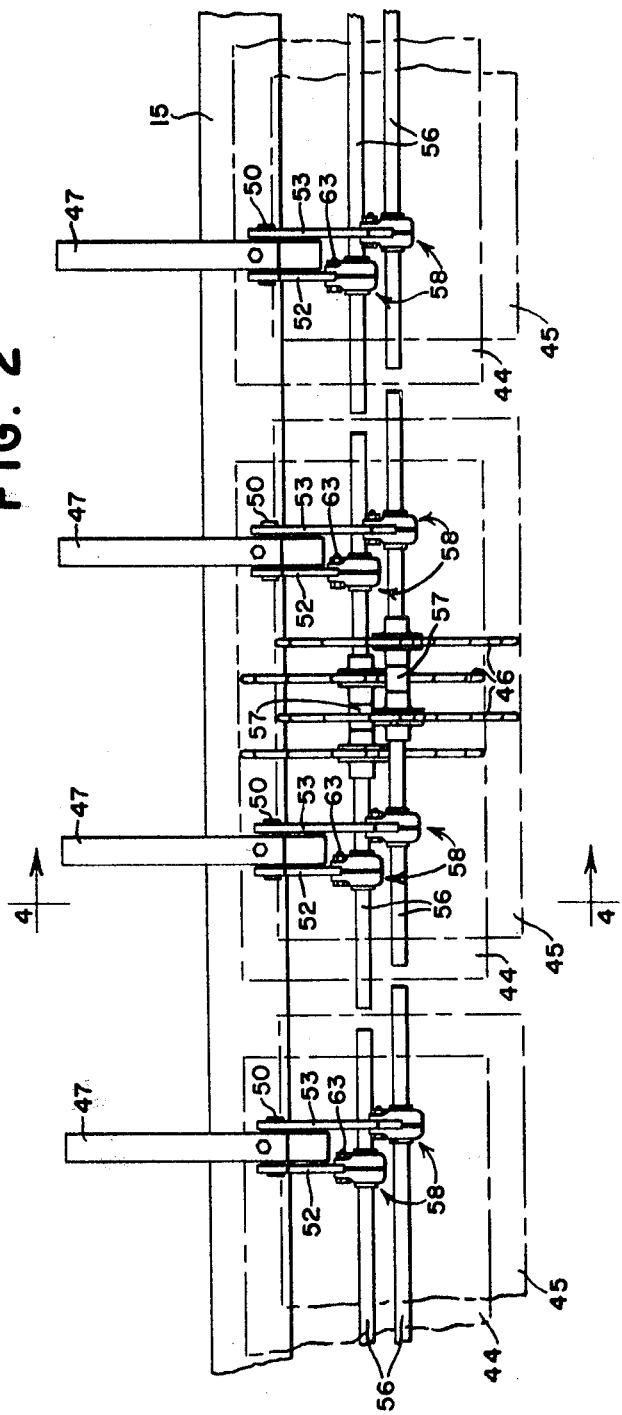

INVENTOR.
EDWARD CLYDE RYAN

BY William A. Murray
ATTORNEY

PATENTED SEP 28 1971  3,608,646

*INVENTOR.*
EDWARD CLYDE RYAN

BY William A. Murray

ATTORNEY

ROTARY HOE

BACKGROUND OF THE INVENTION

The present invention relates generally to rotary hoes and more particularly relates to the mounting of gangs of hoe wheels to a tool bar.

Since rotary hoes were first designed to be pulled behind horses, there has been very little advancement in their design and they are not longer compatible with today's tractors. Tillage implements to be used with the modern tractor must cover a large area so that the power of the tractor is fully utilized, must be sufficiently flexible to follow the ground contour over their entire width and easily pass over damaging obstructions such as rocks, and, in the case of integral or semi-integral implements, must have sufficient weight for ground penetration but not be too heavy to be safely lifted by the tractor three-point hitch.

To date, there are not rotary hoes which meet all the requirements listed above. Many designs of rotary hoes partially meet the flexibility requirement by mounting gangs of hoe wheels on subframes which are individually suspended from a main frame. However, in such a design, each subframe must have sufficient weight to cause soil penetration of the hoe wheels which it carries, and the combined weight of the heavy subframes and the main frame limit the width of an implement which can be safely integrally connected to the tractor. An example of such a rotary hoe is illustrated in U.S. Pat. No. 3,318,389 issued May 9, 1967 to C. A. Kirchner. Other rotary hoe designs, such as that illustrated in U.S. Pat. No. 2,996,128 issued Aug. 15, 1961 to G. F. Gardner, have partially avoided the weight problem by elimination of the main frame, but their width has been extremely limited because of insufficient flexibility.

SUMMARY OF THE INVENTION

It is an object of the present invention to provide a rotary hoe which is of simplified design as compared to rotary hoes presently available on the market, is extremely durable, and which inherently possesses more flexibility than any other presently available design.

Another object of the invention is to provide a rotary hoe which has a plurality of sets of front and rear gangs of hoe wheels individually suspended from a tool bar in a manner which provides a high degree of flexibility, does not require the use of bulky subframes, and transfers the weight of the tool bar to the gangs.

More specifically, it is an object of the invention to suspend the gangs of hoe wheels of a rotary hoe from a tool bar by leaf springs which will transfer the weight of the tool bar to the gangs but will allow relative vertical movement between the gangs and between opposite ends of any single gang.

Yet another object of the invention is to provide a rotary hoe in which the gangs of hoe wheels are suspended from a tool bar by resilient means which will permit relative vertical movement between the gangs and in which a portion of the weight of either gang of a front and rear set of gangs can be transferred to the other gang of the set.

Still another object of the invention is to provide a rotary hoe in which each gang of hoe wheels is suspended at its opposite ends from a tool bar, the suspension means being resiliently yieldable and connected to the gang shafts through universal bearings so that one end of a gang can move vertically with respect to the other end without exerting a torsional force on the suspension means.

The above objects and additional objects and advantages will become apparent along with the details of construction of preferred embodiments from a reading of the following detailed description when taken in conjunction with the accompanying drawings.

BRIEF DESCRIPTION OF THE DRAWINGS

In the Drawings:

FIG. 1 is a perspective view of a rotary hoe constructed in accordance with the principles of the present invention;

FIG. 2 is a rear elevational view of a portion of the rotary hoe illustrated in FIG. 1;

DESCRIPTION OF THE PREFERRED EMBODIMENT

Figure 3:
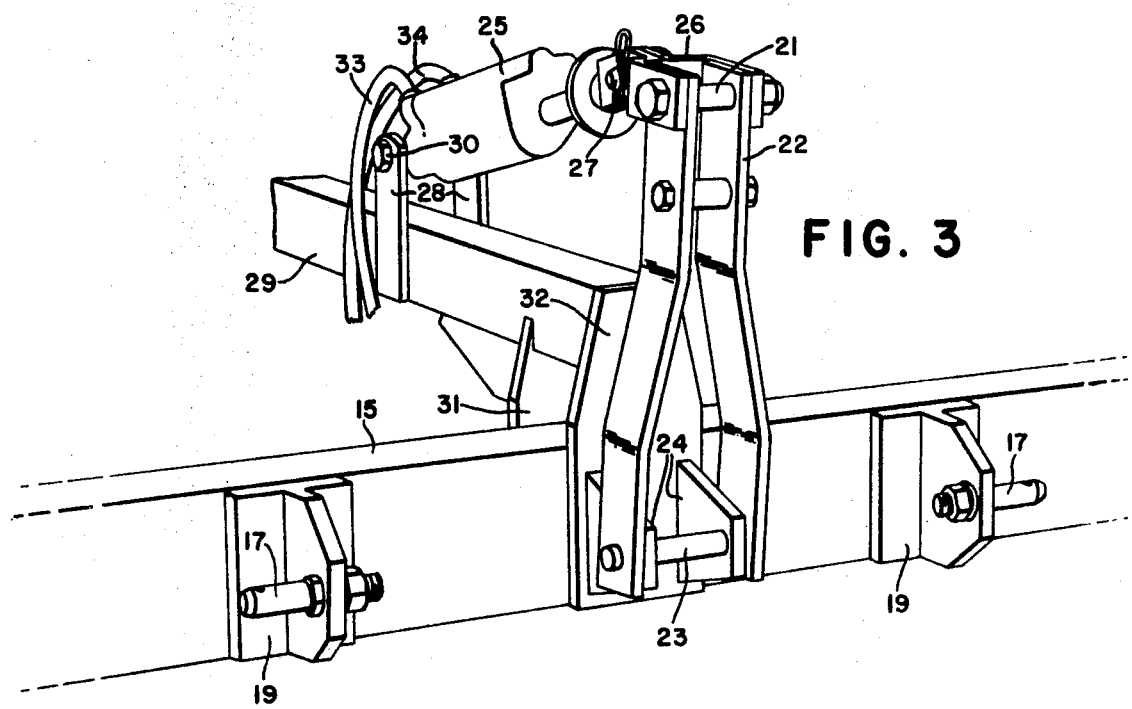
FIG. 3 is a perspective view of the hitch mechanism for the rotary hoe illustrated in FIG. 1.

Referring now to the drawings, and in particular to FIGS. 1–5 wherein one preferred embodiment of the invention is illustrated, the rotary hoe indicated generally at 14 includes a transversely extending main frame or tool bar 15 which is carried by the three-point hitch of a tractor 16. The tool bar 15 is provided with a pair of transversely spaced and transversely extending hitch pins 17 which are adapted to extend through the conventional apertured balls carried by the trailing ends of the draft links 18 of the tractor three-point hitch. The pins 17 are carried by brackets 19 which are secured to the forward side of the tool bar 15 in any convenient manner such as welding. The upper link 20 of the tractor three-point hitch is connected to a pin 21 on the upper end of a mast 22. The mast 22 is rotatably mounted at its lower end on a pin 23 which in turn is mounted to the forward end of the tool bar 15 by brackets 24.

For reasons which will be apparent hereinafter, the tool bar can be rotated about a transverse axis which extends along the longitudinal axis of the pins 17 and 23. Movement of the tool bar about the pins 17 and 23 is under the control of an extensible and retractable double-acting hydraulic cylinder 25 which has its rod end pivotally connected by pin 27 to a bracket 26 on the upper end of the mast 22 and its anchor end by pin 30 to a pair of upstanding arms 28 fixed to a rearwardly extending beam 29. The rearwardly extending beam 29 is in longitudinal alignment with the mast 22 and is fixed to the tool bar 15 by brackets 31 and 32 which may be welded or otherwise suitably secured to both the tool bar 15 and beam 29. A pair of fluid lines 33 and 34 interconnect the hydraulic cylinder 25 with conventional remote cylinder outlets on a tractor 16 so that the tractor operator, by manipulation of the conventional hydraulic controls on the tractor, can extend or retract the cylinder 25 to rotate the tool bar 15 about the pins 17 and 23.

Due to the length of the tool bar 15, the rotary hoe 14 exceeds the legal width for highway or road transport and is also too wide for movement through restricted areas such as gates which may be encountered when moving from field to field. Therefore, the rotary hoe 14 is provided with transport wheels 35, 36 and 37 which are used for endwise transport. Each of the transport wheels 35, 36 and 37 are carried by a fork 38, which in turn is secured to a pivot shaft 39. The shafts 39 of the transport wheels 35 and 36 can be alternately mounted in sleeves 40 and 41 which are mounted to the respective ends and top, respectively, of the tool bar 15 in any suitable manner such as welding. The shaft 39 of the transport wheel 37 is adapted to be inserted through opposite ends of a sleeve 42 mounted on the extreme rearward end of the beam 29 in any suitable manner such as welding. Each of the shafts 39 can be retained within its respective sleeve in any desired manner such as by inserting pins through the projecting ends thereof. When the rotary hoe 14 is mounted to the tractor three-point hitch, the shafts 39 of the transport wheels 35 and 36 will be mounted in the sleeves 41 and the shaft 39 of the transport wheel 37 will be inserted through the upper end of the sleeve 42 as illustrated in FIG. 1. When it is desired to transport the rotary hoe 14, the tractor three-point hitch is raised in the well-known conventional manner to raise the rotary hoe 14.

The transport wheels 35 and 36 are then moved to the sleeves 40 while the shaft for the transport wheel 37 is removed and inserted through the bottom end of the sleeve 42. The rotary hoe 14 is then lowered to rest on the transport wheels, is disconnected from the tractor three-point hitch, and is again connected to the tractor by a tongue 43 which is pivotally connected to the fork 38 of the transport wheel 36.

Figure 4:
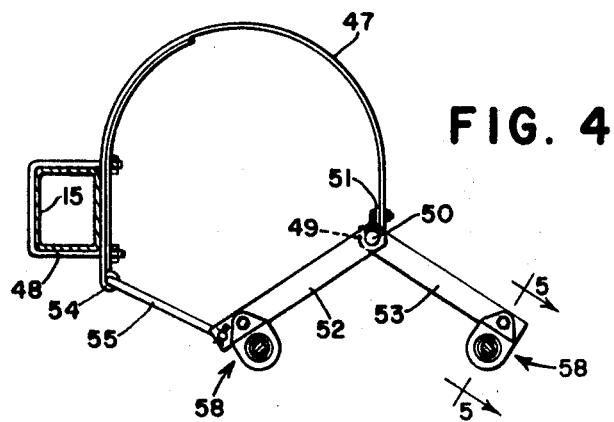
FIG. 4 is a sectional view taken substantially along the line 4—4 of FIG. 2, but with the hoe wheels omitted.

A plurality of transversely aligned sets of front and rear gangs 44 and 45 of hoe wheels 46 are suspended from the tool bar 15 by leaf springs 47. The leaf springs 47 are generally of semicircular shape and are secured to the tool bar 15 in spaced relationship by bolt clamps 48. As best seen in FIG. 4, the rearward most end of each leaf spring 47 is provided with a reverse bend 49 which rotatably carries a rockshaft 50. The rockshaft 50 is retained within the reverse bend 49 by one leg of a right angle bracket 51 which is bolted or otherwise suitably secured to the spring 47. The rockshaft 50 has rigidly secured to its ends a pair of crank arms 52 and 53 which extend downwardly and outwardly therefrom in divergent relationship. The forward most end of each spring 47 extends slightly below the tool bar 15 and is bent around on itself to form an eye 54 which pivotally receives one end of a draft link 55. The opposite end of the draft link 55 extends through an opening provided in the forward most end of the associated crank arm 52.

Figure 5:
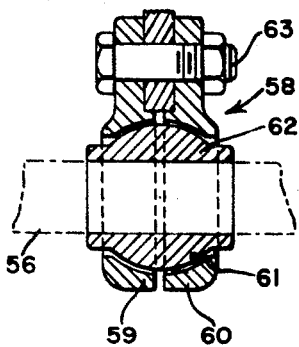
FIG. 5 is a sectional view taken substantially along the line 5—5 of FIG. 4.

Each of the gangs 44 and 45 includes a gang shaft 56 which rotatably carries the hoe wheels 46. The hoe wheels 46 are maintained in spaced relationship on the shafts 56 by spacers 57 positioned between each pair of adjacent hoe wheels. The shafts 56 are mounted to the lower ends of the crank arms 52 and 53 by universal bearings 58 so that the shafts can have universal pivotal movement with respect to the arms 52 and 53. As best illustrated in FIG. 5, each of the bearings 58 includes two housing sections 59 and 60 which are recessed to form a spherical pocket 61 which carries a generally spherical-shaped bearing member 62. The housing sections 59 and 60 are secured to the lower ends of the arms 52 and 53 in mating relationship by bolts 63. Each set of front and rear gangs 45 and 46 is carried by two adjacent springs 47, with the shaft for the front gang 44 mounted on the crank arms 52 and the shaft for the rear gang 45 mounted on the crank arms 53. The housing sections 59 and 60 of the bearings 58 have substantially the same width as the spacers 57 so that each bearing 58 can be positioned between two adjacent hoe wheels 46 without affecting the spacing thereof. Also, since the crank arms 52 and 53 are transversely offset from each other, the hoe wheels of the rear gang will not follow directly behind the hoe wheels of the front gang but will follow midway between the hoe wheels of the front gang. By having the crank arms 52 and 53 extend downwardly as well as outwardly, the front and rear gangs can be positioned closer together in overlapping relationship and the rockshaft 50 will be above the area of overlap between the front and rear gangs. By having the hoe wheels overlap, the size of the implement is reduced and the wheels of each gang of a front and rear set of gangs will prevent dirt buildup between the wheels of the other gang of the front and rear set.

In use, the rotary hoe 14 is lowered by the tractor three-point hitch until the hoe wheels 46 have reached the desired depth. When the rotary hoe 14 is lowered, the weight of the tool bar 15 is transferred through the springs 47 and crank arms 52 and 53 to the hoe wheels 46 so that there is sufficient weight on the hoe wheels 46 to achieve the desired earth penetration. As the rotary hoe is drawn forwardly by the tractor, the resistance of the hoe wheels 46 to movement through the soil is taken up by the tool bar 15 through the draft links 55. Since the gangs 44 and 45 are mounted to the tool bar 15 through universal bearings and springs, the gangs 45 and 46 can conform to the soil contour through the entire width of the rotary hoe 14 and each can freely move over damaging obstructions such as rocks without affecting the other gangs. For example, should one end of a front gang hit a rock, it will tend to both move the end of the corresponding crank arm 52 upwardly and also defect the rearward end of the spring upwardly. The upward movement of the forward end of the crank arm 52 will cause a corresponding downward movement of the lower end of the crank arm 53, and the downward movement of the crank arm 53 will substantially offset the upward movement of the rearward end of the spring 47 so that the rear gang 45 will be affected very little by the upward movement of the front gang 44. As one end of the front gang 44 is deflected upwardly, the spherical bearing member 62 will rotate within the bearing housing sections 59 and 60 so that the springs 47 which carry the deflected gang will not be subjected to a torsional force and the spring on the opposite end of the deflected gang will be affected very little by the deflection of the one end of the gang. As the front gang 44 clears the obstruction, it will be returned to its original position by the resiliency of the springs 47 and the rear gang 45 will move upwardly as it begins to pass over the obstruction.

The weight of the implement carried by the front and rear gangs can be shifted from the front gangs to the rear gangs or vice versa by rotating the tool bar 15 about the axis formed by the pins 17 and 23. This can best be understood with reference to FIG. 4. As the tool bar 15 is rotated clockwise, as viewed in FIG. 4, the rockshaft 50 will be lowered with respect to the point of connection between the forward end of the draft link 55 and the spring 47. This movement has the effect of removing a portion of the weight from the front gangs and placing it on the rear gangs. The amount of weight transferred is dependent upon the degree of rotation of the tool bar 15. If the tool bar 15 is rotated counterclockwise, the opposite action will occur and the weight will be transferred from the rear gangs to the front gangs.

Figure 6:
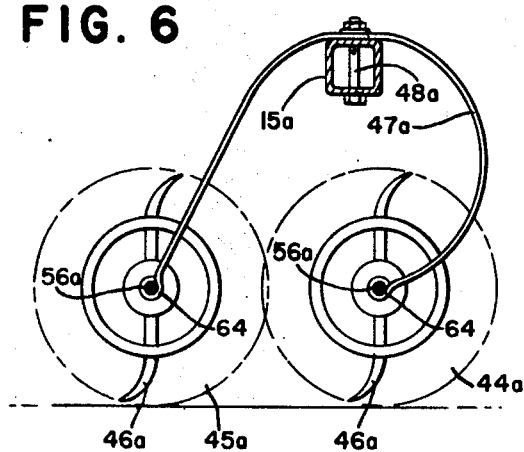
FIGS. 6 and 7 are views similar to FIG. 4 but illustrating modified forms of the invention.

Referring now to FIG. 6 wherein a second embodiment of the invention is illustrated, the leaf springs 47a are secured intermediate their ends to the tool bar 15a by bolts 48a. The springs 47a extend generally transversely to the length of the tool bar 15a and are bent downwardly on the opposite sides of the points of securement with the tool bar 15a so that the ends thereof are positioned well below the tool bar 15a. The extreme ends of the springs 47a are bent to form journals 64 which carry the gang shafts 56a which in turn rotatably carry the hoe wheels 46a.

As in the embodiment illustrated in FIGS. 1–5, the springs 47a will transfer the weight of the tool bar 15a to the front and rear gangs 44a and 45a and will also permit relative vertical movement between the gangs. For example, should the front gang 44a meet an obstruction such as a rock, it is free to move upwardly by deflecting the forward end of the spring 47a upwardly. Since the front and rear gangs are mounted on the ends of the springs 47a on opposite sides of their points of attachment with the tool bar 15a, the upward movement of the front gang 44a will not have any effect on the rear gang 45a. As the front gang 44a passes over the obstruction, it will be returned to its working position by the resiliency of the spring 47a, and at the same time the rear gang 45a will begin to move upwardly over the obstruction. It should be noted that the gangs 44a and 45a can be mounted to the ends of the springs 47a by universal bearings in the same manner as the gangs in the first described embodiment so that if only one end of one of the gangs is deflected upwardly, it will have very little effect on the spring carrying the opposite end of the gang and will not impose a torsional force on the springs.

Figure 7:
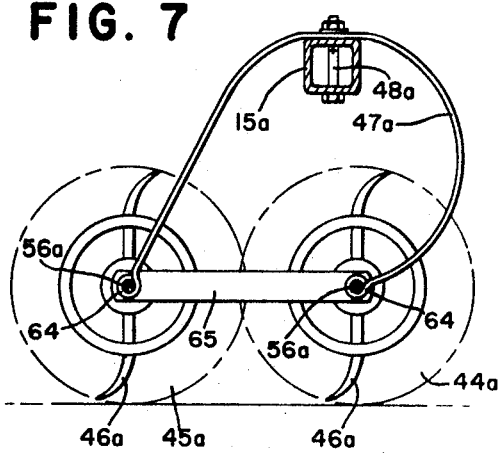

Another embodiment of the invention is illustrated in FIG. 7 and with the exception of rigid links 65 extending between the front and rear gangs is identical to the embodiment illustrated in FIG. 6. The link 65 acts to maintain the front and rear gangs 44a and 45a spaced apart from each other a fixed distance and also equalizes the draft force exerted on the opposite ends of the springs 47a. As illustrated, the link 65 is provided with openings at the opposite ends thereof which receive the gang shafts 56a. However, the link 65 could be provided with universal bearings at the opposite ends similar to the bearings provided on the first described embodiment of the invention and the ends of the springs 47a could be secured to the ends of the link 65 rather than to the gang shafts 56a. Here again the universal bearings would allow one end of a gang to be deflected upwardly without materially affecting the spring carrying the opposite end of the gang and would also prevent torsional forces from being applied to these springs.

Figure 8:
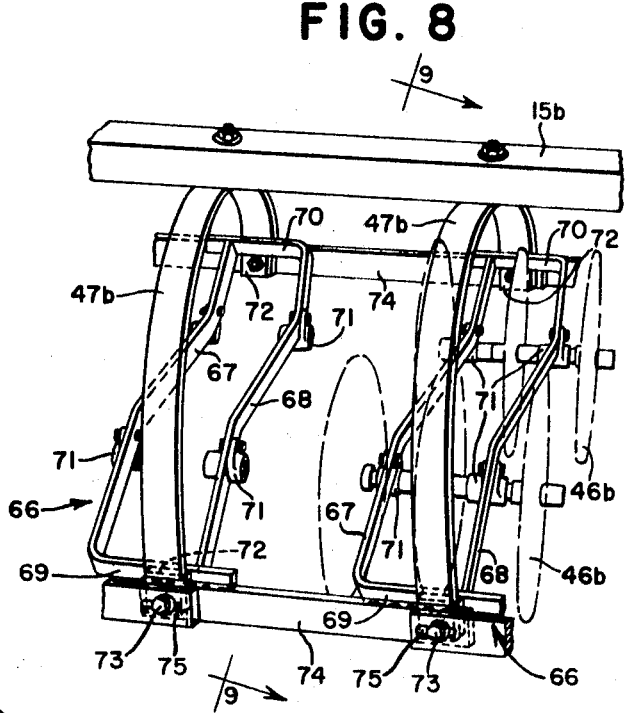
FIG. 8 is a perspective view of a portion of still another modified form of the invention.
Figure 9:
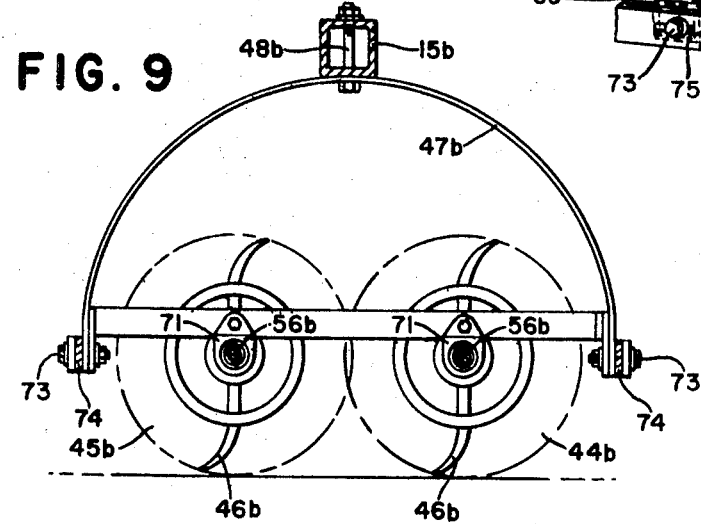
FIG. 9 is a sectional view taken substantially along the line 9—9 of FIG. 8.

A fourth embodiment of the invention in which each set of front and rear gangs 44b and 45b are suspended from the tool bar 15b by a single leaf spring 47b as illustrated in FIGS. 8 and 9. Each of the leaf springs 47b is generally of semicircular shape, is secured intermediate its ends to the tool bar 15b by a bolt 48b and has its ends projecting generally downwardly. Each set of front and rear gangs 44b and 45b mounted on a light subframe indicated generally at 66. Each subframe member consists of a pair of spaced fore-and-aft extending frame members 67 and 68 which are joined together at their ends by transversely extending frame members 69 and 70. Bearings 71 are fixed to the frame members 67 and 68 and rotatably carry the gang shafts 56b which in turn rotatably carry the hoe wheels 46b.

The frame members 69 and 70 are provided with apertured ears 72 which serve to mount the subframe 66 to the depending ends of the springs 47b. The subframes 66 are mounted to the springs 47b by bolts 73 which extend through apertures provided in the ends of the springs 47b and through the apertured ears 72. The ends of each pair of adjacent springs 47b are loosely connected together by links 74 which are provided with elongated slots 75 at their opposite ends for reception of bolts 73.

In use, the springs 47b will transmit the weight of the tool bar 15b to the subframe 66 so that the gangs 44b AND 45b will carry sufficient weight to cause adequate soil penetration of the hoe wheels 46b. The bolts 73 mounting each subframe 66 to its respective spring 47b are aligned in a fore-and-aft direction to form an axis about which the adjacent subframe is free to rock so that the gangs can conform to the most rugged soil contours. Also, each set of front and rear gangs can be deflected upwardly without affecting any of the adjacent sets of front and rear gangs due to the lost motion between the pins 73 and links 74 provided by the elongated slots 75. For example, as one set of front and rear gangs moves over an obstruction, the bolts 73 mounting that gang to the corresponding spring 47b will move within the corresponding slot 75 so that the adjacent sets of front and rear gangs will not be affected. The link 74 will, however, prevent any one set of gangs from being deflected laterally a greater distance than is allowed by the elongated slot 75. Since the subframe 66 can rock about the bolts 73, the rotary cultivator illustrated in FIGS. 8 and 9 works exceptionally well for cultivation of embedded crops as well as flat land crops.

I claim:

1. An integral rotary hoe comprising: a single elongated tool bar extending generally transversely to the normal direction of movement of the rotary hoe; means secured to the tool bar for integral connection with a vertically movable and power-operated tractor hitch; a plurality of generally transversely aligned sets of front and rear gangs of hoe wheels; each gang of hoe wheels including a generally transversely extending shaft and a plurality of hoe wheels mounted on the shaft; a plurality of leaf springs spaced along the tool bar and rigidly connected directly to the tool bar; there being at least one leaf spring for each set of gangs of hoe wheels; and each leaf spring being connected to the shaft of both the front and rear gangs of one of the sets of gangs, whereby, when the tool bar is raised by the tractor hitch, the gangs of hoe wheels are resiliently suspended from the tool bar by the leaf springs; and, when the tool bar is lowered by the tractor hitch, the weight of the tool bar is transferred through the leaf springs to the gangs of hoe wheels.

2. The rotary hoe set forth in claim 1 wherein each set of gangs is supported by a pair of leaf spring means, and the front and rear gangs of each set of gangs are maintained in spaced relationship by rigid link means extending between and having opposite ends journaled to the shafts of the front and rear gangs.

3. The rotary hoe set forth in claim 2 wherein each leaf spring means is generally of inverted U-shape; one leg of each leaf spring means is mounted on the tool bar; and each of the link means is rotatably mounted intermediate its ends to the free leg of one of the leaf spring means.

4. The rotary hoe set forth in claim 3 wherein draft link means extends between and is pivotally connected to the forward end of each of the first mentioned link means and the tool bar.

5. The rotary hoe set forth in claim 4 wherein the shafts of the front and rear gangs are carried on the ends of the first-mentioned link means by universal bearing means which afford limited universal pivotal movement of each shaft with respect to the link means.

6. The rotary hoe set forth in claim 5 wherein each of said first mentioned link means is generally of inverted V-shape and is rotatably mounted at the apex thereof to the free leg of the corresponding leaf spring means.

7. The rotary hoe set forth in claim 6 wherein the ends of said first mentioned link means are spaced a fore-and-aft distance apart less than the diameter of the hoe wheel, whereby the hoe wheels of the front and rear gangs overlap.

8. The rotary hoe set forth in claim 1 wherein each of said leaf spring means is generally of arcuate shape, is mounted medially its ends to the tool bar and has its ends extending generally downwardly below the tool bar in fore-and-aft alignment, and each set of front and rear gangs is mounted on and carried by the ends of a single leaf spring means.

9. The rotary hoe set forth in claim 8 wherein each set of front and rear gangs is carried by a subframe having front and rear ends connected to the ends of one of the leaf spring means.

10. The rotary hoe set forth in claim 9 wherein each subframe is mounted to the corresponding leaf spring means for rotation about a generally fore-and-aft extending axis.

11. The rotary hoe set forth in claim 10 wherein the ends of each leaf spring means are interconnected with the corresponding ends of each adjacent leaf spring means by transversely extending link means which limit lateral deflection of any single one of the leaf spring means.

12. The rotary hoe set forth in claim 11 wherein said transversely extending link means include lost motion means whereby each of said leaf spring means has a limited degree of movement independent of the movement of the adjacent leaf spring means.

13. The rotary hoe set forth in claim 1 wherein each of said leaf spring means is generally of arcuate shape, is mounted medially its ends to said tool bar with its ends projecting below said tool bar in fore-and-aft alignment, and wherein the forward and rearward ends of each pair of leaf spring means carry the front and rear gangs, respectively, of one set of gangs.

14. The rotary hoe set forth in claim 13 wherein rigid link means extend between the front and rear gangs of each set of gangs and maintain the front and rear gangs a fixed distance apart.

15. A rotary hoe comprising: a set of tandem gangs of hoe wheels; a pair of rigid link means extending between and journaled to the shafts of the front and rear gangs of said set by universal bearing means which afford limited universal pivotal movement of each shaft with respect to the links; each of said link means being of generally inverted V-shape; and resilient means suspending each of the link means from a tool bar; each of the link means being rotatably mounted at its apex to the resilient means.

16. The rotary hoe set forth in claim 15 wherein the fore-and-aft distance between the ends of each of said link means is less than the diameter of a hoe wheel whereby the wheels of said gangs will be in overlapping relationship.

17. A rotary hoe comprising: a transversely extending elongated tool bar; a plurality of sets of tandem gangs of rotary hoe wheels positioned rearwardly of the tool bar; a pair of leaf springs resiliently suspending each set of tandem gangs from the tool bar with each leaf spring being connected to both gangs of its respective set of tandem gangs whereby the sets of tandem gangs can move vertically with respect to the tool bar and with respect to each other by flexing the springs; and force-transmitting means including rigid links connected to the sets of tandem gangs and extending forwardly therefrom to a connection with the tool bar to transmit the resistance of the rotary hoe wheels to movement through the soil to the tool bar.

18. The rotary hoe set forth in claim 17, and further including means for rocking said tool bar about an axis extending generally parallel thereto.

19. A rotary hoe comprising: a transversely extending elongated frame member; a plurality of sets of tandem gangs of rotary hoe wheels positioned rearwardly of the frame member; each set of tandem gangs including rigid link means extending between and interconnecting the front and rear gangs of the set; a plurality of resilient members interconnecting the sets of tandem gangs and the frame member; each of said resilient members being fixedly mounted adjacent one end directly to the frame member and extending over the front gang of one of the sets of tandem gangs, and having its other end connected to one of the link means intermediate the front and rear gangs; whereby said sets of tandem gangs can move vertically with respect to said frame member and with respect to each other by flexing said resilient members.

20. The rotary hoe set forth in claim 19 wherein each of said resilient members is a leaf spring.

21. The rotary hoe set forth in claim 19 wherein each of said resilient members is generally of inverted U-shape, has one leg fixedly connected adjacent the end thereof to said frame member, and has the other end pivotally connected to one of the link means.

22. The rotary hoe set forth in claim 19 and further including draft link means extending between each set of tandem gangs and the frame member.

23. A rotary hoe comprising: a transversely extending elongated frame member; a plurality of sets of tandem gangs of hoe wheels positioned rearwardly of the frame member; means interconnecting the front and rear gangs of each set of tandem gangs; means resiliently suspending each set of tandem gangs from the frame member to permit vertical movement of the sets of tandem gangs with respect to the frame member; said last-mentioned means being connected directly to said frame member, extending over the front gangs of the sets of gangs, and being connected to said first-mentioned means; and draft means connected to each set of tandem gangs and extending forwardly therefrom to a connection with the frame member.

24. A rotary hoe comprising: a frame member extending generally transversely to the normal direction of movement of said rotary hoe; means on the frame member for connection with a propelling vehicle; a plurality of sets of tandem gangs of hoe wheels positioned rearwardly of said frame member; means interconnecting the front and rear gangs of each set of tandem gangs; means suspending each set of tandem gangs from said frame member; said last-mentioned means extending over the front gangs of the sets of tandem gangs and being connected to the frame member and the means interconnecting the front and rear gangs; at least a portion of the suspending means being resilient to allow the sets of gangs to move generally vertically relative to the frame member by deflecting the resilient portion of the suspending means; and draft means extending between the frame member and the sets of tandem gangs.

25. The rotary hoe set forth in claim 24 wherein each of the suspending means is generally of inverted U-shape, has its forward leg secured to the frame member and the lower end of its rear leg pivotally connected to one of the means interconnecting the front and rear gangs.

26. The rotary hoe set forth in claim 25 wherein an integral extension of the front leg of the suspending means extends below the frame member, the draft means includes a plurality of rigid draft links, and each draft link is pivotally connected at its forward end to the integral extension of the forward leg of one of the suspending means and extends rearwardly to a pivotal connection with one of the means interconnecting the front and rear gangs.

27. The rotary hoe set forth in claim 26, wherein each of the means interconnecting the front and rear gangs includes a rigid, generally inverted V-shaped link having its opposite ends journaled to the gang shafts of the front and rear gangs of one of the sets of tandem gangs, and the lower end of the rear leg of each suspending means is pivotally connected to the apex of one of the rigid V-shaped links.

28. The rotary hoe set forth in claim 27 wherein each of the suspending means is a leaf spring.

29. A rotary hoe comprising: a transversely extending elongated frame member, a plurality of gangs of hoe wheels positioned rearwardly of the frame members; each of the gangs including a gang shaft and a plurality of hoe wheels rotatably mounted on the shaft; a pair of resilient bars suspending each gang from the frame member; each of the resilient bars being secured adjacent one end to the frame member and having its opposite end journaled to the shaft of the associated gang by universal bearing means which affords limited universal pivotal movement of the shaft with respect to the bar.

30. The rotary hoe set forth in claim 29 further including draft link means extending from the gangs forwardly to the frame member to transmit the resistance of the hoe wheels to movement through the soil to the frame member.

31. A rotary hoe comprising: a tool bar extending generally transversely to the normal direction of movement of the rotary hoe; means on the tool bar for integral connection with a vertically movable and power-operated tractor hitch; a plurality of sets of tandem gangs of hoe wheels positioned rearwardly of the tool bar; means interconnecting the front and rear gangs of each set of tandem gangs; means supporting each set of tandem gangs from the tool bar; the last-mentioned means extending over the front gangs of the sets of gangs and being connected to the frame member and means interconnecting the front and rear gangs; the supporting means including resilient means yieldable to permit the sets of gangs to move generally vertically relative to the tool bar; and draft means extending between the tool bar and the sets of tandem gangs.

32. The rotary hoe set forth in claim 31 wherein each of the supporting means is generally of inverted U-shape, has its forward leg secured to the tool bar and the lower end of its rear leg pivotally connected to one of the means interconnecting the front and rear gangs.

33. The rotary hoe set forth in claim 32 wherein an integral extension of the front leg of the supporting means extends below the tool bar, the draft means includes a plurality of rigid draft links, and each draft link is pivotally connected at its forward end to the integral extension of the forward leg of one of the supporting means and extends rearwardly to a pivotal connection with one of the means interconnecting the front and rear gangs.

34. The rotary hoe set forth in claim 33 wherein each of the means interconnecting the front and rear gangs includes a rigid, generally inverted V-shaped link having its opposite ends journaled to the gang shafts of the front and rear gangs of one of the sets of tandem gangs, and the lower end of the rear leg of each supporting means is pivotally connected to the apex of one of the rigid V-shaped links.

35. The rotary hoe set forth in claim 34 wherein each of the supporting means is a leaf spring.

36. An integral rotary hoe comprising: a single elongated tool bar extending generally transversely to the normal direction of movement of the rotary hoe; means secured to the tool bar for integral connection with a vertically movable and power-operated tractor hitch; a plurality of generally transversely aligned sets of front and rear gangs of hoe wheels positioned rearwardly of the tool bar; each gang of hoe wheels including an elongated shaft and a plurality of hoe wheels mounted on the shaft; rigid link means extending between and journaled to the shafts of the front and rear gangs of each set of gangs; a plurality of suspension means spaced along the length of the tool bar, secured to the tool bar, and extending from forward ends slightly beneath the tool bar upwardly along a side of tool bar, rearwardly over the front gangs of the sets of gangs, and downwardly to ends connected to the rigid link means; and a draft link pivotally connected to the forward end of each rigid link means and extending forwardly to a pivotal connection with the forward end of one of the suspension means.

37. The rotary hoe set forth in claim 36 wherein at least a portion of each suspension means is resiliently yieldable to afford vertical movement of the gangs with respect to the tool bar.

38. The rotary hoe set forth in claim 37 wherein each of the rigid link means is of inverted V-shape, and the rear end of each suspension means is pivotally connected to the apex of one of the rigid link means.

39. A rotary hoe comprising: a transversely elongated frame member; a plurality of gangs of hoe wheels positioned rearwardly of the frame member; a pair of leaf springs resiliently suspending each gang of hoe wheels from the frame member whereby the gangs can move vertically with respect to the frame member by flexing the springs, said gangs being connected to the leaf springs by universal bearing means which afford limited universal pivotal movement of the gangs with respect to the springs; and draft means interconnecting the frame member and gangs to transmit the resistance of the hoe wheels to movement through the soil to the frame member, the draft means including draft links each pivotally connected at one end to one of the gangs and extending forwardly to a pivotal connection with the frame member at its opposite end.

UNITED STATES PATENT OFFICE
CERTIFICATE OF CORRECTION

Patent No. 3,608,646          Dated  28 September 1971

Inventor(s) Edward Clyde Ryan

It is certified that error appears in the above-identified patent and that said Letters Patent are hereby corrected as shown below:

Column 6, line 21, change "the" (2nd occ.) to -- a --.

Column 8, line 17, change "members" to -- member --; line 38, after "and" insert -- the --.

Column 9, line 5, after "of" (1st occ.) insert -- the --.

Signed and sealed this 6th day of June 1972.

(SEAL)
Attest:

EDWARD M. FLETCHER, JR.
Attesting Officer

ROBERT GOTTSCHALK
Commissioner of Patents